United States Patent
Sellner

(10) Patent No.: US 8,113,145 B2
(45) Date of Patent: Feb. 14, 2012

(54) TEAT CUP LINER

(75) Inventor: Duane F. Sellner, Winona, MN (US)

(73) Assignee: GEA Farm Technologies, Inc., Naperville, IL (US)

( * ) Notice: Subject to any disclaimer, the term of this patent is extended or adjusted under 35 U.S.C. 154(b) by 0 days.

(21) Appl. No.: 11/904,607

(22) Filed: Sep. 27, 2007

(65) Prior Publication Data
US 2009/0084319 A1 Apr. 2, 2009

(51) Int. Cl.
*A01J 5/06* (2006.01)
(52) U.S. Cl. .................. 119/14.47; 119/14.49
(58) Field of Classification Search .......... 119/14.47, 119/14.48, 14.49, 14.51
See application file for complete search history.

(56) References Cited

U.S. PATENT DOCUMENTS

| | | | |
|---|---|---|---|
| 3,079,891 A | 3/1963 | Miller | |
| 3,967,587 A | 7/1976 | Noorlander | |
| 4,745,881 A | 5/1988 | Larson | |
| 4,924,809 A | 5/1990 | Verbrugge | |
| 5,007,378 A | 4/1991 | Larson | |
| 5,161,482 A * | 11/1992 | Griffin | 119/14.02 |
| 5,572,947 A | 11/1996 | Larson et al. | |
| 5,752,462 A | 5/1998 | Petersson | |
| 6,164,243 A | 12/2000 | Larson | |
| 6,427,624 B1 * | 8/2002 | Briggs et al. | 119/14.47 |
| 6,755,153 B1 | 6/2004 | Chowdhury | |
| 6,776,120 B1 | 8/2004 | Chowdhury | |
| 6,895,890 B1 | 5/2005 | Maier, Jr. | |
| 7,290,498 B2 | 11/2007 | Shin | |
| 7,293,527 B2 | 11/2007 | Shin | |
| 2006/0005772 A1 | 1/2006 | Shin | |
| 2006/0016399 A1 | 1/2006 | Torgerson | |
| 2008/0035064 A1 * | 2/2008 | Petterson et al. | 119/14.47 |

FOREIGN PATENT DOCUMENTS

| | | |
|---|---|---|
| DE | 1 011 212 | 6/1957 |
| WO | WO 00/69252 | 11/2000 |
| WO | WO 2006/004761 | 1/2006 |

OTHER PUBLICATIONS

English language Translated Description and Claims of DE 1 011 212, European Patent Office's esp@cenet.com database, 3pp.
PCT/ISA/220, Notification of Transmittal of the International Search Report and the Written Opinion of the ISA, or the Declaration Nov. 10, 2008, 1 p.
PCT/ISA/210, International Search Report Nov. 10, 2008, 2pp.
PCT/ISA/237, Written Opinion of the International Searching Authority Nov. 10, 2008, 6pp.
Notification Concerning Transmittal of International Preliminary Report on Patentability (Chapter I of the Patent Cooperation Treaty) Apr. 8, 2010, 1p.
PCT/ISA/373, International Preliminary Report on Patentability received Apr. 8, 2010, 1p.
PCT/ISA/237, Written Opinion of the International Searching Authority Apr. 8, 2010, 4pp.

\* cited by examiner

*Primary Examiner* — Son T Nguyen
(74) *Attorney, Agent, or Firm* — Smith Law Office

(57) ABSTRACT

A milking machine teat cup liner having a dome and a barrel, and the barrel has an upper transition portion and a lower square portion. The transition section mates with the round cross-section of the dome and the square cross-section of the lower square portion to provide superior vacuum seal with less irritation and damage to teat tissue.

4 Claims, 2 Drawing Sheets

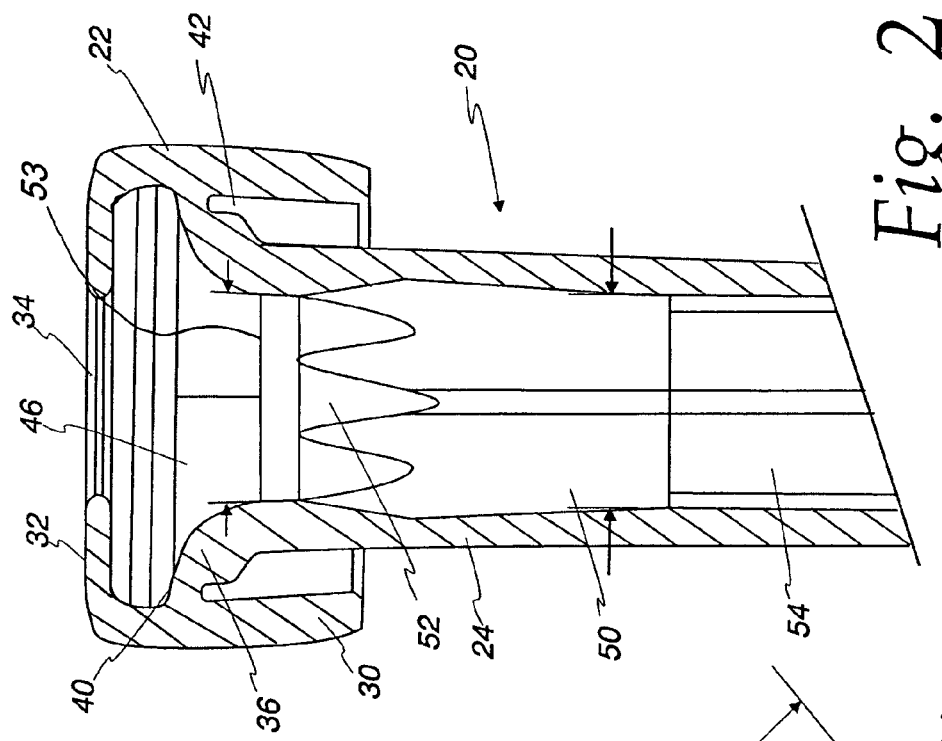
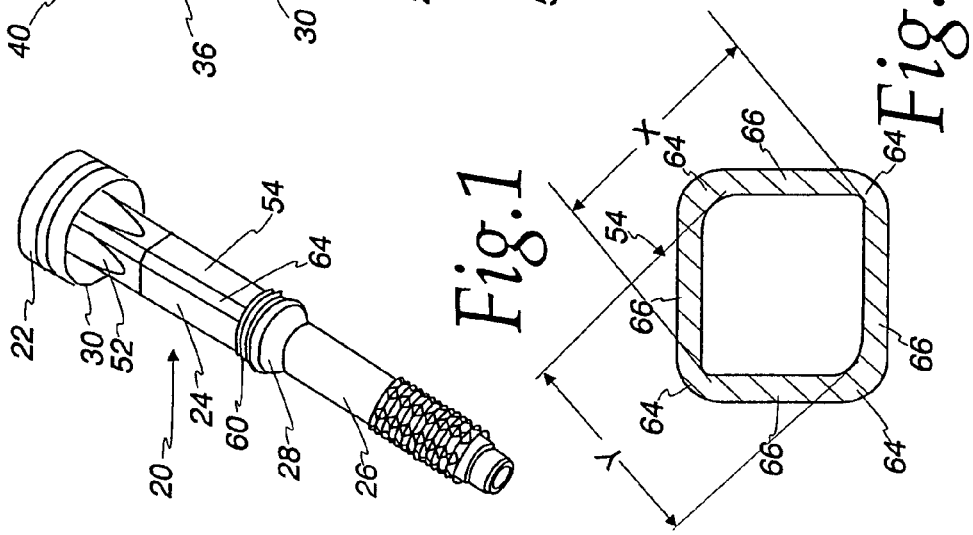

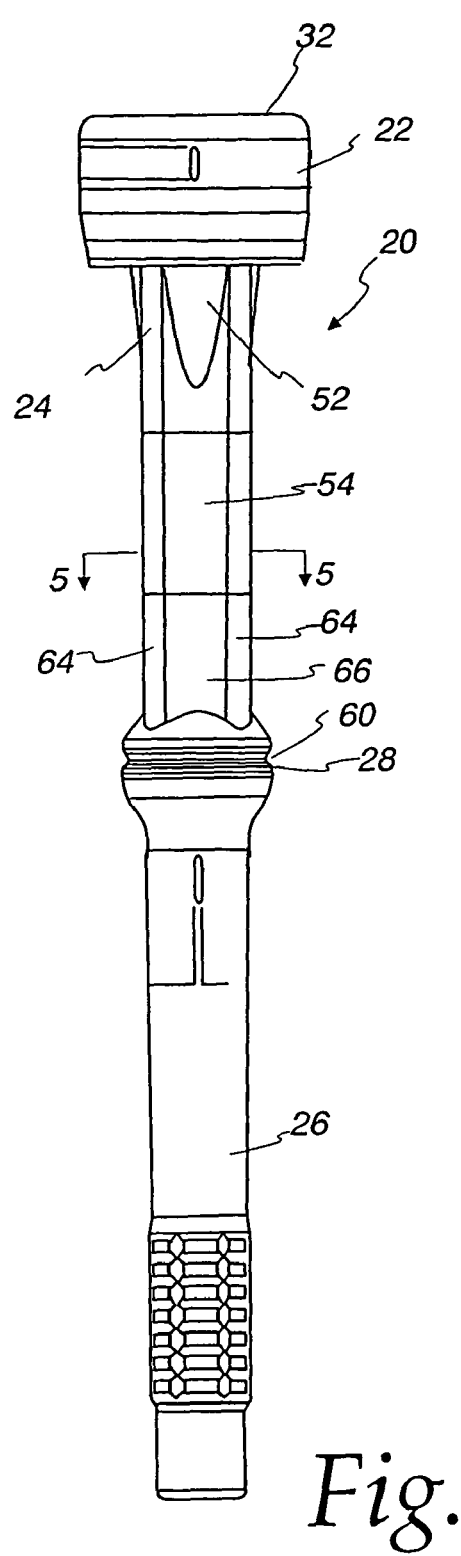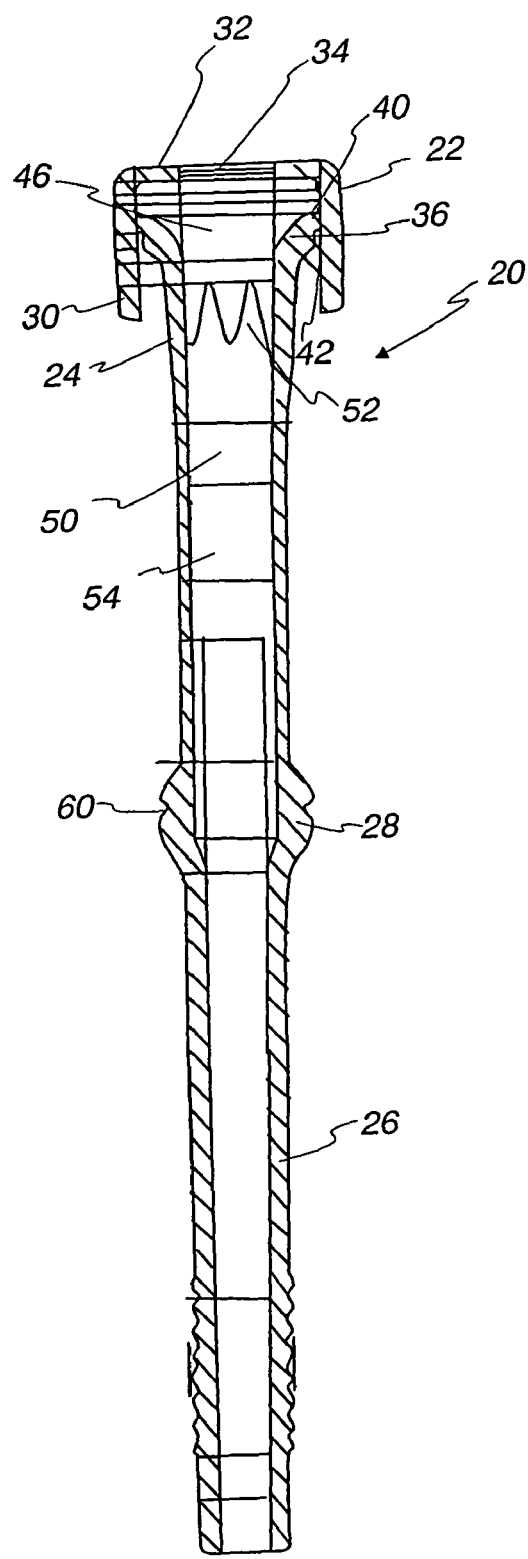

TEAT CUP LINER

FIELD AND BACKGROUND OF THE INVENTION

This invention relates generally to liners for milking machine teat cups, and more particularly to improved teat cup liners that provide a superior seal against a teat upper portion and a controlled collapse around a teat lower portion to reduce tissue irritation and damage while enhancing the milking process.

Dairy animals, and particularly cows, are milked using automated milking machines. The milking machines include a milking unit including four teat cups, tubes downstream from the teat cups, a claw that acts as a manifold connected to the tubes for receiving milk, a pulsator, and pulsation tubes. The milking machines connect downstream with equipment for collecting milk.

The interface between milking machine and animal is a flexible liner inside a teat cup. A teat fits inside the liner during milking. An annular space between the liner and the teat cup is called a pulsation chamber. Vacuum from a vacuum pump is controlled by the pulsator to provide the pulsation of vacuum and pressure necessary to withdraw milk from the teats. A continuous vacuum is applied inside the liner to withdraw milk and keeps the milking unit attached to a cow. The continuous vacuum causes congestion of blood and other fluids in teat tissue. To relieve this congestion, atmospheric air is allowed into the pulsation chamber by the pulsator so that the flexible liner collapses onto the teat to relieve the congestion in the teat tissue. This pulsating action efficiently milks dairy animals.

The liner design is critical to obtaining efficient and complete milking while simultaneously providing maximum comfort and minimal irritation to the animal teats. Liners include at least two key components. First, is an upper dome portion and second is a lower barrel portion. Some liners include short tubes extending downstream from the liner barrel to connect to the milking claw. Other liners are designed to be connected to a separate short milk tube.

The upper dome portion includes an upper surface defining an opening through which a teat is inserted. The dome also includes an outer cylindrical wall with a lip to engage a teat cup. The dome defines an inner volume in which the vacuum acts to hold the milking unit on the animals. The shape and volume of liner domes have been studied for applying optimum vacuum and pressure to teats. (See U.S. Pat. No. 5,752,462.)

Liner barrels too have been the subject of considerable study. A basic liner barrel is cylindrical and essentially round in cross-section. When atmospheric pressure is applied in the pulsation chamber against the outer surface of the liner barrel, it collapses by flattening into a tight oval shape, and thereby applies pressure from two sides against a teat. Since teats are essentially round in cross-section, the application of pressure from two sides can cause undue stress, irritation, and excessive pressure on teat tissue.

In U.S. Pat. No. 3,967,587, the above problem with round barrels was addressed with a liner barrel having a square cross-section so that pressure was applied from four sides instead of two. The total pressure applied to a liner is the same regardless of whether the liner barrel is round or square in cross-section, so applying that pressure from four sides instead of two reduced the pressure and irritation on the teat by about one half.

One downside to a square-barreled liner is that during the vacuum phase, the teat tissue tends to expand into the corners of the square barrel and cause irritation of teat tissue. Further, the milking machine teat cups are held onto a teat by the vacuum in the liner. Therefore, a seal between teat and liner is necessary so that the milking machine does not fall off the cow during milking. Barrel liners with square cross-sections tend not to form as secure a seal with teats, and premature release can occur.

Thus, there is a need for a milking machine teat cup liner that will form a secure seal with a dairy animal teat, while simultaneously applying relatively uniform and gentle pressure to a teat for milking.

SUMMARY OF THE INVENTION

The present invention overcomes the excessive pressure applied by a liner barrel with a circular cross-section and the tissue irritation and vacuum loss that can result from a liner barrel with a square cross-section. The present invention utilizes a liner barrel with a round cross-section in its upper portion and a square cross-section in its lower portion to obtain a uniform seal with minimal irritation in the upper portion of a teat and with reduced pressure applied to the lower portion of a teat.

A liner in accordance with the present invention includes an upper dome portion having a top surface defining a teat opening, and a barrel joined to or formed integrally with the dome. The barrel has an upper transition portion with a substantially round cross-section and a lower portion with a substantially square cross-section. The upper portion can be tapered so that it has a generally round cross-section and becomes progressively smaller in diameter from top to bottom.

The upper round cross-section portion of the liner barrel creates a transition from the round cross-section of the liner dome to the lower square cross-section of the barrel. The beginning of the transition can begin at a lower end of a rounded shoulder inside the liner dome. Alternatively, the upper extreme of the transition section may be measured from the top surface of the dome when a dome shoulder is not present or has an irregular shape, for example.

Preferably, the transition portion is from between about one-half inch to one and a half inches long, and extends downward from the liner dome shoulder. The transition portion can begin from about three-quarters of an inch to about one and one half inch from the top of the liner dome. Another alternative is to have a transition portion that is up to about thirty percent of the total length of the liner barrel.

BRIEF DESCRIPTION OF THE DRAWINGS

FIG. 1 is a perspective view of a teat cup liner in accordance with the present invention;

FIG. 2 is a partial cross-section of a teat cup liner in accordance with the present invention;

FIG. 3 is a side view of a teat cup liner in accordance with the present invention;

FIG. 4 is a cross-section of a teat cup liner in accordance with the present invention; and FIG. 5 is a cross-sectional view of a liner barrel taken along line 5-5 in FIG. 3.

DETAILED DESCRIPTION OF THE PREFERRED EMBODIMENTS

In the following detailed description of the preferred embodiments, the same reference numeral will be used to identify the same item in each of the drawings. Illustrated generally in FIGS. 1 through 4 is a teat cup liner 20 in accordance with the present invention, having an upper dome 22, a barrel 24, and an optional short milk tube 26. Typically, liners 20 are made of rubber or silicone and are molded in a single piece.

Liners 20 are shaped and sized to fit within a teat cup of a milking machine (not illustrated). The teat cup and liner 20 cooperate to form an inflation that alternates applying pressure and vacuum from a vacuum pump (not illustrated) to massage a dairy animal's teat to withdraw milk.

The liner 20 dome 22 includes an annular wall 30, an upper surface 32, a teat opening 34 in the upper surface 32, and a shoulder 36. The annular wall 30 is connected to an upper portion 40 of the shoulder 36, but is spaced apart from the rest of the shoulder 36 and the barrel 24 to define a recess 42 into which the top of a teat cup fits to secure the liner 20 to the teat cup. The upper surface 32 of the dome 22 is essentially flat, and the teat opening 34 is essentially round and sized to fit closely to a dairy animal teat inserted therethrough.

The dome shoulder 36 is spaced from the upper surface 32 to define a chamber 46 inside of the dome 22. The shoulder 36 radius and spacing from the upper surface 32 can be selected to create a desired chamber 46 volume. In some liners, the shoulder 36 may not be well-defined or have a consistent radius. Nonetheless, in a preferred embodiment of the present invention, the shoulder 36 has a radius of about 0.351 inches and extends into the liner 20 dome 22 about 0.75 inches.

Extending downward from the shoulder 36 is the barrel 24. The barrel 24 defines a bore 50 into which a dairy animal teat will fit. The barrel 24 of the present invention includes an upper transition portion 52 and a lower square portion 54. The upper transition portion 52 changes in cross-sectional shape from the round dome 22 to the lower square portion 54. Preferably, the transition portion 52 tapers from a relatively large internal diameter to a relatively small diameter from top to bottom. The preferred upper diameter is between about 0.828 inches and about 0.930 inches, and the shape is generally conical and tapers by about three to about ten degrees with the most preferred being about five degrees per side downward and inward. The preferred lower internal diameter is about 0.828 inches. The total length of the upper transition portion 52 is about 1.25 inches to about 1.38 inches long.

Preferably, the upper transition portion 52 has a length that is measured downward from the dome 22 shoulder 36 and has a length in the range of about three-quarters of an inch to about one and one-half inches. More preferably, the transition portion 52 is about 1.387 inches long. Alternatively, regardless of the dome shoulder 36 size, the top 53 of the transition portion 52 can begin from about three-quarters of an inch to about one and one-half inch down from the upper surface 32 of the dome 22, and extend downward the length described above. The total length of the barrel 52 is between about 4.75 inches and 4.90 inches, and will increase (stretch) by about 0.919 inches plus or minus 0.060 inches when installed. The measurements are preferred only, and other measurements that accomplish the objectives herein are within the scope of the present invention. Indeed, measurements may vary depending on the animals being milked and the average teat size of the animals being milked.

The lower square portion 54 is desirable for reducing pressure on teat tissue and the corners 64 resist bending and remain relatively straight while the flat sides 66 collapse. The wall thickness of the barrel square portion 54 is about 0.100 inches, while the corner-to-corner dimensions X and Y (FIG. 5) are preferably 0.942 inches across one side and 0.828 inches across the other side. The larger dimension X corresponds to corners with a 0.059 inch radius and the smaller dimension Y corresponds to a corner radius of about 0.197 inches. This differential causes the square barrel portion 54 to collapse in a roughly diamond shape for better control of the collapse and application of pressure to the teat.

The lengths of the transition portion 52 and the square portion 54, may be expressed in terms of ratios, as well. For example, the transition portion 52 may be about 20% to about 40% with the most preferred being about 30% of the total barrel 24 length. As used herein "upper" means the upstream end of the liner 20 and "lower" means the downstream end of the liner 20.

As indicated above, the liner 20 and teat combine to define an inner volume. The lower end of the inner volume of the liner 20 is defined by the inside rounded corner of the square barrel portions 54 adjacent to the short milk tube 26. The upper end of the volume is defined by the inner top of the dome 22.

The short milk tube 26 that extends down from the barrel 24 is optional and short milk tubes of other shapes and sizes, could be used, including short milk tubes that are separate elements to be attached to the liner 20.

Between the barrel 24 and the short milk tube 26 is a thickened connector portion 28 that defines an annular recess 60 for engaging a hole in the bottom of a teat cup to maintain the liner 20 in a secure and extended position within the teat cup.

The foregoing detailed description of the drawings is meant for clearness of understanding only, and no unnecessary limitations therefrom should be read into the following claims. In particular, the terms "round" and "square" are general terms intended to cover generally oval and rectangular shapes, respectively. These terms may also include shapes with imperfect symmetry and unequal corner angles, for example, because exact shapes formed with flexible materials are not possible.

The invention claimed is

1. A liner for a milking machine teat cup, the liner comprising:
   a dome having an upper surface and a substantially round cross-section and a dome shoulder; and
   a barrel joined to the dome, the barrel defining a bore for receiving a dairy animal teat and having an upper transition portion joined to a lower portion of the dome shoulder, the upper transition portion having a substantially round cross-section and a sealing surface for creating a substantially uniform seal with the dairy animal teat to reduce vacuum loss in the bore when the liner is collapsed, and a lower transition portion that is substantially square in cross-section.

2. The liner of claim 1, wherein the upper transition portion has a length of between about three-quarters of an inch to about one and one-half inches.

3. The liner of claim 1, wherein a top of the transition portion is from about three-quarters of an inch to about one and one-half inch from the upper surface of the dome.

4. The liner of claim 1, wherein the upper transition portion is generally conical in shape and tapers downward at an angle of about three degrees to about ten degrees.

* * * * *